United States Patent [19]
Takahashi et al.

[11] 3,897,375
[45] July 29, 1975

[54] MINERAL-PIGMENT AND BUTADIENE COPOLYMER BINDER PAPER COATING COMPOSITIONS

[75] Inventors: Akikazu Takahashi, Matsudo; Yuji Futatsugi, Chiba; Hiroo Wakayama, Funabashi; Takamu Yao, Narashino, all of Japan

[73] Assignee: Dainippon Ink & Chemicals Inc., Tokyo, Japan

[22] Filed: Nov. 26, 1973

[21] Appl. No.: 419,059

[52] U.S. Cl. .......... 260/8; 260/29.7 D; 260/29.7 H; 260/29.7 T
[51] Int. Cl. ............................................. C08h 7/00
[58] Field of Search .............. 260/8, 29.7 H, 29.7 T, 260/29.7 D

[56] References Cited
UNITED STATES PATENTS

| | | | |
|---|---|---|---|
| 2,709,689 | 5/1955 | Herzog et al. | 260/29.7 D |
| 3,002,940 | 10/1961 | Holloway | 260/29.7 D |
| 3,331,667 | 7/1967 | Schnabel | 260/6 X |
| 3,377,192 | 4/1968 | Kirk et al. | 117/64 |
| 3,392,048 | 7/1968 | Rolik | 117/155 |
| 3,404,116 | 10/1968 | Pueschner et al. | 260/29.7 |
| 3,407,164 | 10/1968 | Schmidt | 260/29.7 D |
| 3,409,569 | 11/1968 | Lane et al. | 260/8 |

*Primary Examiner*—Melvin Goldstein
*Assistant Examiner*—Edward Woodberry
*Attorney, Agent, or Firm*—Sherman & Shalloway

[57] ABSTRACT

A paper coating composition comprising 1. 100 parts by weight of a mineral pigment; and
2. 3-35 parts by weight, calculated as solids, of an aqueous solution of pH of at least 8 in which there has been dissolved a compound selected from the group consisting of an ammonium salt, an alkali salt and an amine salt of a copolymer of 20-70 weight % of butadiene, 20-80 weight % of at least one monoethylenically unsaturated carboxylic acid and 0-60 weight % of a third monomer selected from the group consisting of methyl acrylate, methyl methacrylate, ethyl acrylate, ethyl methacrylate, styrene, alpha-methlystyrene, acrylonitrile, methacrylonitrile, vinyl chloride and vinyl pyridine.

4 Claims, No Drawings

MINERAL-PIGMENT AND BUTADIENE COPOLYMER BINDER PAPER COATING COMPOSITIONS

This invention relates to composition suitable for coating paper comprising a mineral pigment and as a binder an aqueous solution of an ammonium, alkali or amine salt of a butadiene copolymer containing the carboxyl group.

Heretofore, such a paper coating composition was made up of a pigment and, as binder, a carboxylated synthetic rubber latex and casein (see, e.g., U.S. Pat. No. 3,399,080 and Japanese Patent 657,209). However, paper coated with such a composition does not have a high enough printability, especially "dry pick" strength and "wet rub" resistance such as to make it fully satisfactory.

It is therefore an object of this invention to provide a paper coating composition which will provide paper with excellent printability, especially dry-pick and wet-rub properties.

It has now been found that satisfactory printability, especially dry-pick and wet-rub properties can be imparted to paper by a composition [I] consisting of (1) 100 parts by weight of a mineral pigment and (2) 3 – 35 parts by weight, calculated as solids, of an aqueous solution of a pH of the least 8 in which there has been dissolved either an ammonium, alkali or amine salt of a copolymer of 20 – 70 weight % of butadiene, 20 – 80 weight % of at least one monoethylenically unsaturated carboxylic acid and 0 – 60 weight % of a third monomer selected from the group consisting of methyl acrylate, methyl methacrylate, ethyl acrylate, ethyl methacrylate, styrene, alpha-methylstyrene, acrylonitrile, methacrylonitrile, vinyl chloride and vinyl pyridine.

The monoethylenically unsaturated carboxylic acids to be used in the present invention can be chosen from the following group; acrylic acid, methacrylic acid, itaconic acid, fumaric acid, maleic acid and crotonic acid.

The forgoing aqueous solution of a salt of a copolymer is prepared by adding with stirring to an acidic aqueous latex of a copolymer prepared by the usual emulsion polymerization method and containing the foregoing components, an alkaline aqueous solution, e.g., ammonia water, an aqueous caustic alkali (e.g. NaOH or KOH) solution or an aqueous amine (e.g. monoethanolamine) solution, and preferably ammonia water, to adjust the pH of the solution to the prescribed value. The aqueous solution of a salt of the aforesaid copolymer conveniently usable in the present invention is one whose solids content is 5 – 40 % by weight.

In a number of cases the aqueous latex can be first adjusted to a pH of about 7.0, after which it can then be mixed with a pigment and the other components such as a binder and thereafter be transformed to an aqueous solution.

The foregoing latex may be prepared by known procedures for polymerization in aqueous emulsion. Typically the monomers are dispersed in an aqueous solution of from about 0.05 to 1 percent of a polymerization initiator, such as potassium persulfate, and from about 0.2 to 5 percent of a pH stable surface active agent capable of emulsifying the monomers. Many such surface active agents are known. Polymerization is initiated by heating the emulsified mixture at usually between 30° and 70°C. and is continued by maintaining the polymerizing emulsion at the selected temperature. After the polymerization has reached the desired conversion of monomers to polymer, the latex is filtered to remove any precoagulum and may be stabilized to storage by the addition of a small amount of known stabilizers.

The paper coating composition of this invention is prepared by intermixing the foregoing aqueous solution of a salt of copolymer with a mineral pigment by conventional blending methods.

We also found the surprising fact that when a composition [II] obtained by mixing, in addition to the aforesaid components (1) and (2), 1 – 30 parts by weight of casein (3) per 100 parts by weight of (1) was used as a paper coating, unexpectedly high water retention was demonstrated, and the coating layer obtained on drying exhibited unexpectedly high dry pick and wet pick properties.

Thus, in accordance with the present invention as another embodiment thereof, there is provided a coating composition [II] comprising (1) 100 parts by weight of a mineral pigment; (2) 3 – 35 parts by weight, calculated as solids, of an aqueous solution of a pH of at least 8 in which there has been dissolved either an ammonium, alkali or amine salt of a copolymer of 20 – 70 weight % of butadiene, 20 – 80 weight % of at least one monoethylenically unsaturated carboxylic acid and 0 – 60 weight % of a third monomer selected from the group consisting of methyl acrylate, methyl methacrylate, ethyl acrylate, ethyl methacrylate, styrene, alpha-methylstyrene, acrylonitrile, methacrylonitrile, vinyl chloride and vinyl pyridine; and (3) 1 – 30 parts by weight of casein.

Further, the invention composition can also contain 1 – 30 parts by weight, calculated as solids, per 100 parts by weight of the pigment of a carboxylate synthetic rubber latex that has been customarily used in the art.

Hence, there are provided according to this invention as still other embodiments thereof a coating composition [III] comprising (1) 100 parts by weight of a mineral pigment; (2) 3 – 35 parts by weight, calculated as solids, of an aqueous solution of a pH of at least 8 in which there has been dissolved either an ammonium, alkali or amine salt of a copolymer of 20 – 70 weight % of butadiene, 20 – 80 weight % of at least one monoethylenically unsaturated carboxylic acid and 0 – 60 weight % of a third monomer selected from the group consisting of methyl acrylate, methyl methacrylate, ethyl acrylate, ethyl methacrylate, styrene, alpha-methylstyrene, acrylonitrile, methacrylonitrile, vinyl chloride and vinyl pyridine; and (3) 1 – 30 parts by weight, calculated as solids, of a carboxylated synthetic rubber latex; and a coating composition [IV] comprising (1) 100 parts by weight of a mineral pigment; (2) 3 – 35 parts by weight, calculated as solids, of an aqueous solution of a pH of at leat 8 in which there has been dissolved either an ammonium, alkali, or amine salt of a copolymer of 20 – 70 weight % of butadiene, 20 – 80 weight % of at least one monoethylenically unsaturated carboxylic acid and 0 – 60 weight % of a third monomer selected from the group consisting of methyl acrylate, methyl methacrylate, ethyl acrylate, ethyl methacrylate, styrene, alpha-methylstyrene, acrylonitrile, methacrylonitrile, vinyl chloride and vinyl pyridine; (3) 1 – 30 parts by weight of casein; and (4) 1 – 30 parts by weight, calculated as solids, of a carboxylated synthetic rubber latex.

The carboxylated synthetic rubber latex is widely used in the art, typical examples being carboxylated styrene-butadiene rubber latex, carboxylated methyl methacrylate-butadiene rubber latex and carboxylated acrylonitrile-butadiene rubber latex. As commerical products, those marketed by Dow Chemical Company under the trade name of DOW-636 and DOW-620 are readily available. Again, these latices can be readily prepared by the method disclosed in U.S. Pat. No. 3,399,080.

The mineral pigment to be used in the present invention include such as clay, calcium carbonate, aluminum hydroxide, satin white, titanium dioxide, etc.

For various applications, it is desirable to have certain additives incorporated in the composition. Typical examples of such additives are the metal chelating agent, coloring agent and stabilizers.

The coating compositions are well adapted for application to paper and other similar materials. The compositions may be applied to paper by roller, air-knife, brush, spray or other known coating methods. The coatings exhibit high dry pick strength and high wet rub resistance.

The advantages of the compositions and the resultant coatings will be more apparent from the following illustrative examples where all parts and percents are by weight.

In Examples A – C the aqueous solutions of salts of copolymers are prepared, while in Examples 1 – 9 the paper coating compositions are prepared.

Example A

A monomer mixture consisting of 40 parts of butadiene, 10 parts of styrene and 50 parts of acrylic acid was emulsified in 180 parts of water in a reaction vessel along with an emulsifier (3.0 parts of sodium polyoxyethylenealkylether sulfonate), a chelating agent (0.05 part of EDTA), a modifier (2.0 parts of tert. -dodecyl mercaptane) and a peroxygen type polymerization initiator (0.10 part of potassium persulfate). This emulsified mixture was then stirred for 10 hours at 60°C. to obtain an aqueous latex of a copolymer having a pH of 3.0.

A 28% aqueous $NH_4OH$ solution was added to the so obtained aqueous latex with stirring to prepare an aqueous solution of an ammonium salt of the foregoing copolymer, the solids content of which solution was 20% and pH was 9.0. This is designated aqueous solution [A].

Example B

A monomer mixture consisting of 30 parts of butadiene, 40 parts of methacrylic acid, 20 parts of styrene and 10 parts of acrylonitrile was emulsified in 180 parts of water in a reaction vessel along with an emulsifier (2.0 parts of sodium polyoxyethylenealkylether sulfonate), a chelating agent (0.05 part of EDTA), a modifier (0.50 part of tert. -dodecyl mercaptane) and a peroxygen type polymerization initiator (0.10 part of potassium persulfate). This emulsified mixture was then stirred for 10 hours at 60°C. to obtain an aqueous latex of a copolymer having a pH of 3.2.

A 20% aqueous $NH_4OH$ solution was added to the so obtained aqueous latex with stirring to prepare an aqueous solution of a potassium salt of copolymer, the solids content of which solution content was 20% and pH was 9.0. This is designated aqueous solution [B].

Example C

The experiment was operated exactly as in Example B, except that a monomer mixture consisting of 50 parts of butadiene, 20 parts of methyl methacrylate, 2 parts of fumaric acid and 28 parts of methacrylic acid was used instead of the monomer mixture consisting of butadiene, methacrylic acid was used instead of the monomer mixture consisting of butadiene, methacrylic acid, styrene and acrylonitrile to obtain and aqueous latex of a copolymer having a pH of 3.0.

A 10 % aqueous KOH solution was added to the so obtained aqueous latex with stirring to prepared an aqueous solution of a potassium salt of this copolymer, the solids content of which solution was 10 % and pH was 8.2. This is designated aqueous solution [C].

Examples 1 –5

A clay slurry was prepared by adding 100 parts of kaolin clay to a small quantity of water in which had been dissolved in advance a dispersing agent (0.3 part of sodium tripolyphosphate). The aqueous solution [A] prepared in Example A and casein or a commercial synthetic rubber latex (DOW-636) were mixed to the amounts indicated in Table 1 with the foregoing clay slurry in the order given to obtain a paper coating composition whose total solids content was 45%.

The so obtained composition was then applied to high grade paper at the rate of about 20 grams per square meter with a bar coater followed by drying for 2 minutes at 105°C. and thereafter passing through a super calender (55°C., 47 kg/cm) twice. The coated paper was then left standing in an air-contitioned (20°C., 60 % RH) room for 24 hours, following which it was submitted to the following tests for determining its properties.

1. Dry pick

The dry pick was determined by means of an IGT printability tester using the spring device M and IPI No. 7 ink and with a printing pressure of 35 kilograms.

2. Wet pick

An RI tester was used and, after moistening the surface of the coated paper, printing was carried out, the degree of pick in this case being evaluated and classified into five grades. That in which picking occurred over the whole of the paper surface was rated 1, while that in which no picking occurred at all was rated 5.

3. Wet rub

A black paper was placed in front of the coated paper. One drop of water was dropped onto the surface of the coated paper and, after allowing the wetted spot to stand for 1 minute, this was rubbed with the finger. The coating layer that comes off with this operation was transferred to the black paper placed in front of the coated paper. This operation was repeated ten times. The amount of coating transferred to the black paper was then examined, and the degree thereof was evaluated and assigned the ratings 5 (none) – 1 (great).

4. Gloss and ink gloss

A gloss meter (Model Murakami GM-3) was used, and the reflectivities (%) at an angle of 75° to the surface of the coated paper were measured.

The compositions and properties of the paper coating compositions as well as the results of the tests of the physical properties of the coatings are shown in Table 1, below.

Table 1

| Experiment No. | Components (parts by weight of solid) | | | Viscosity* (cps) | Water retention** (sec) | Gloss (%) | Ink gloss (%) | Dry pick (cm/sec) | Wet pick | Wet rub |
|---|---|---|---|---|---|---|---|---|---|---|
| | Aqueous solution [A] | Casein | DOW-636 | | | | | | | |
| Example 1 | 20 | — | — | 3000 | 40 | 54 | 85 | 128 | 3 | 5 |
| do. 2 | 16 | 4 | — | 2400 | 270 | 53 | 88 | 140 | 4 | 4 |
| do. 3 | 10 | 10 | — | 1800 | 72,400 | 51 | 83 | 130 | 5 | 5 |
| do. 4 | 10 | — | 10 | 550 | 40 | 56 | 85 | 180 | 5 | 5 |
| do. 5 | 5 | 5 | 10 | 1300 | 72,400 | 58 | 86 | 165 | 5 | 5 |
| Control | — | 10 | 10 | 1300 | 68 | 57 | 87 | 108 | 3 | 1 |

\* Viscosity measured with a BM viscosimeter at 60 rpm.
\*\* Water retention was determined in the following manner.
A small quantity of finely divided potassium permanganate was placed on a filter paper cut to the dimensions of 3 cm × 3 cm. This filter paper was then placed atop the surface of the paper coating composition. The time required for the water contained in the composition to wet the filter paper, dissolve the finely divided potassium permanganate and color the filter paper after it was placed atop the paper coating composition was measured. This value in seconds was used to indicate the water retention.

Examples 6 – 8

95 Parts of clay and 5 parts of calcium carbonate were added to a small quantity of water in which has been dissolved in advance a dispersing agent (0.4 part of sodium polyacrylate) to prepare a slurry. To this slurry was then added severally 9 parts, calculated as solids, of the aqueous solutions [A] – [C] prepared in Examples A – C, following which the mixture were thoroughly stirred. To the so obtained mixtures was then added 10 parts, calculated as solids, of a commercial carboxylated synthetic rubber latex (DOW-636) followed by thorough stirring to obtain paper coating compositions whose total solids content was 40 %.

The properties of these compositions are shown in Table 2.

Table 2

| Experiment No. | Aqueous solution | Viscosity (cps) | Gloss (%) | Ink gloss (%) | Dry pick (cm/sec) |
|---|---|---|---|---|---|
| Example 6 | [A] | 290 | 49 | 86 | 130 |
| do. 7 | [B] | 305 | 50 | 84 | 120 |
| do. 8 | [C] | 275 | 51 | 87 | 125 |
| Control | casein | 310 | 49 | 85 | 80 |

EXAMPLE 9

In this example the effects of the pH of the aqueous solution of the salt of the copolymer are examined.

By operating as in Example A aqueous solutions of an ammonium salt of the copolymer, the pH of which solutions were 8.6 (present invention) and 7.1 (control), were prepared. Paper coating compositions were then prepared from these aqueous solutions as in Examples 1 – 5.

A comparison of the properties of two compositions are shown in Table 3.

Table 3

| Aqueous solution | pH of aqueous solution | Viscosity (cps) | Water retention (sec) | Gloss (%) | Ink gloss (%) | Dry pick (cm/sec) | Wet pick |
|---|---|---|---|---|---|---|---|
| Invention | 8.6 | 400 | 28 | 58 | 88 | 147 | 5 |
| Control | 7.1 | 14 | 9 | 64 | 85 | 82 | 2 |

What is claimed is:

1. A paper coating composition comprising
   1. 100 parts by weight of a mineral pigment;
   2. 3 – 35 parts by weight, calculated as solids, of an aqueous solution of a pH of at least 8 wherein has been dissolved a member selected from the group consisting of an ammonium salt, an alkali salt and an amine salt of a copolymer of 20 – 70 weight % of butadiene, 20 – 80 weight % of at least one monoethylenically unsaturated carboxylic acid selected from the group consisting of acrylic acid, methacrylic acid, itaconic acid, fumaric acid, maleic acid and crotonic acid and 0 – 60 weight % of a third monomer selected from the group consisting of methyl acrylate, methyl methacrylate, ethyl acrylate, ethyl methacrylate, styrene, alpha-methylstyrene, acrylonitrile, methacrylonitrile, vinyl chloride and vinyl pyridine; and
   3. 1 – 30 parts by weight, calculated as solids, of a carboxylated synthetic rubber latex.

2. A paper coating composition comprising
   1. 100 parts by weight of a mineral pigment;
   2. 3 – 35 parts by weight, calculated as solids, of an aqueous solution of pH of at least 8 wherein has been dissolved a member selected from the group consisting of an ammonium salt, an alkali salt and amine salt of a copolymer of 20 – 70 weight % of butadiene, 20 – 80 weight % of at least one monoethylinically unsaturated carboxylic acid selected from the group consisting of acrylic acid, methacrylic acid, itaconic acid, fumaric acid, maleic acid and crotonic acid and 0 – 60 weight % of a third monomer selected from the group consisting of methyl acrylate, methyl methacrylate, ethyl acrylate, ethyl methacrylate, styrene, alpha-methylstyrene, acrylonitrile, methacrylonitrile, vinyl chloride and vinyl pyridine;
   3. 1–30 parts by weight of casein; and
   4. 1–30 parts by weight, calculated as solids, of a carboxylated synthetic rubber latex.

3. The composition of claim 1 wherein said copolymer consists of 20 – 70 weight % of butadiene, 20 – 80 weight % of acrylic acid and 5 – 60 weight % of methyl methacrylate.

4. The composition of claim 2 wherein the solids content of said aqueous solution is 5 – 40 weight %.

* * * * *